Patented Feb. 16, 1926.

1,572,952

UNITED STATES PATENT OFFICE.

GUSTAV PISTOR, OF GRIESHEIM-ON-THE-MAIN, GERMANY, ASSIGNOR TO CHEMISCHE FABRIK GRIESHEIM-ELEKTRON, OF FRANKFORT-ON-THE-MAIN, GERMANY.

DRYING CALCIUM HYPOCHLORITE COMPOUNDS.

No Drawing. Application filed March 26, 1925. Serial No. 18,628.

*To all whom it may concern:*

Be it known that I, GUSTAV PISTOR, a citizen of Germany, residing at Griesheim-on-the-Main, Germany, have invented certain new and useful Improvements in Drying Calcium Hypochlorite Compounds, of which the following is a specification.

This invention relates to improvements in the drying of calcium hypochlorite compounds, especially by means of hygroscopic salts, oxides and the like. It is well-known that the stability of the neutral or basic calcium hypochlorite compounds practically free from chloride is a matter of greatest importance with a view to their practical use. Hitherto calcium hypochlorite was carefully dried in vacuo or in a current of hot air, as it had been found that even very small quantities of moisture considerably accelerate the decomposition of calcium hypochlorite. However it is difficult in many respects to remove even these last remnants of moisture by means of heat with or without the aid of a vacuum.

Now I have found that a complete drying of calcium hypochlorite may be attained far more rapidly and in a far more economic manner that hitherto by following the combined method forming the object of the present invention. This combined method consists in a preliminary drying of the calcium hypochlorite by means of heat to a small percentage of moisture, say 1 per cent, and then removing the remainder of water by the addition of hygroscopic media. Such substances are for instance any hygroscopic salts and oxides, so far as these substances are not able to chemically react with calcium hypochlorite under mutual decomposition, such as quicklime (CaO) or calcined gypsum.

This simple method results in increasing the stability of the products thus obtained as compared with that of the products dried by heat alone.

It is a known fact that hygroscopic salts, oxides and the like are employed for removing moisture, especially the addition of caustic lime to bleaching powder is well known. However in this case large quantities of quicklime, at least 30 per cent must be added in order to wholly combine with lime the water present, whereby only a very low-grade product is obtained. In contradistinction to this with my improved method the addition of hygroscopic substances may be so small that the percentage of active chlorine in the product obtained is not considerably diminished, as in consequence of prior drying, all the water, except slight remnants, has been removed from the product which originally contained but little water.

Furthermore I have found it advantageous to introduce the addition during the last stage of the drying process, while the product is still hot, whereby the water contents are rapidly and entirely transferred to the additional substance.

It may be understood that in connection with the method forming the object of my present invention the terms "calcium hypochlorite" or "calcium hypochlorite compounds" comprise as well the neutral calcium hypochlorite as its basic combinations.

I claim:—

1. The method of drying calcium hypochlorite compounds, consisting in preliminarily drying the said compounds by treating them with heat to a small percentage of water and then mixing them with hygroscopic substances which are incapable of reacting with calcium hypochlorite under mutual decomposition.

2. The method of drying calcium hypochlorite compounds, consisting in preliminarily drying the said compounds by treating them with heat in vacuo to a small percentage of water and then mixing them with hygroscopic substances which are incapable of reacting with calcium hypochlorite under mutual decomposition.

3. The method of drying calcium hypochlorite compounds, consisting in preliminarily drying the said compounds by treating them with heat to a small percentage of water and then mixing them while hot with hygroscopic substances.

4. The method of drying calcium hypochlorite compounds, consisting in preliminarily drying the said compounds by treating them with heat in vacuo to a small percentage of water and then mixing them while hot with hygroscopic substances.

5. The method of drying calcium hypochlorite compounds, consisting in preliminarily drying the said compounds by treating them with heat to a small percentage of water and then mixing them with quicklime.

6. The method of drying calcium hypochlorite compounds, consisting in preliminarily drying the said compounds by treating them with heat in vacuo to a small percentage of water and then mixing them with quicklime.

7. The method of drying calcium hypochlorite compounds, consisting in preliminarily drying the said compounds by treating them with heat to a small percentage of water and then mixing them while hot with quicklime.

8. The method of drying calcium hypochlorite compounds, consisting in preliminarily drying the said compounds by treating them with heat in vacuo to a small percentage of water and then mixing them while hot with quicklime.

In testimony whereof I affix my signature.

GUSTAV PISTOR.